US006265953B1

United States Patent
Romano

(10) Patent No.: US 6,265,953 B1
(45) Date of Patent: Jul. 24, 2001

(54) APPARATUS AND METHOD FOR ENHANCING THE ISOLATION OF AN MMIC CROSS-POINT SWITCH

(75) Inventor: Antonio Romano, Cambridge (CA)

(73) Assignee: Com Dev Ltd., Cambridge (CA)

( * ) Notice: Subject to any disclaimer, the term of this patent is extended or adjusted under 35 U.S.C. 154(b) by 0 days.

(21) Appl. No.: 09/339,252

(22) Filed: Jun. 24, 1999

Related U.S. Application Data

(60) Provisional application No. 60/090,692, filed on Jun. 25, 1998.

(51) Int. Cl.$^7$ .................................................. H01P 1/10
(52) U.S. Cl. ............................ 333/101; 333/104; 333/103
(58) Field of Search .................................. 333/104, 103, 333/101, 105

(56) References Cited

U.S. PATENT DOCUMENTS

| | | | |
|---|---|---|---|
| 3,833,866 | * 9/1974 | Boutelant | 333/104 |
| 4,731,594 | * 3/1988 | Kumar | 333/103 |

* cited by examiner

Primary Examiner—Benny Lee
Assistant Examiner—Kimberly E Glenn
(74) Attorney, Agent, or Firm—Daryl W. Schnurr

(57) ABSTRACT

A fully monolithic cross-point switch matrix overcomes the isolation problems between unconnected ports of the prior art. An Isolation Enhancement Network (IEN) is connected between each of the input and output transmission lines at each of the cross-points. The switch matrix is comprised of a tiled interconnection of M×N of the 1×1 switch/IEN (SIEN) cells, where N and M are the number of input and output ports respectively. Each of the SIEN cells can be independently configured into one of two operating modes, connected or unconnected. The switching element is configured to provide a high isolation path between the input and output lines in the unconnected mode of operation. In this case, a small fraction of the input signal injected at the input port appears at the output port. This output signal is comprised of two components. The first component arises from a number of stray coupling mechanisms between the input and output lines but does not include the portion of the input signal which passes through the IEN. The dominant area of this stray coupling occurs at the point where the input and output transmission lines cross. The second component of the output signal is purposely injected via the IEN. The IEN couples a small portion of the input signal, adjust its amplitude and phase, and then recouples it to the output line so that the resultant signal has the same amplitude but is 180 degrees out-of-phase with the first component. The two components cancel each other yielding an improvement in the isolation between the two ports. The compensation signal injected by the IEN into the output line is significantly lower than the main signal component when the switching element is in the connected state, thereby allowing the input signal to be routed to the output with insignificant perturbation.

20 Claims, 10 Drawing Sheets

APPARATUS AND METHOD FOR ENHANCING THE ISOLATION OF AN MMIC CROSS-POINT SWITCH

This appln claims the benefit of Provisional No. 60/090,692 filed Jun. 25, 1998.

BACKGROUND OF THE INVENTION

1. Field of Invention

This invention relates to an apparatus and method for enhancing the isolation of a monolithic microwave integrated circuit (MMIC) crossbar or cross-point switch matrix with high isolation between unconnected paths.

2. Description of the Prior Art

It is known to use microwave switch matrices in communications systems which require reconfigurable routing of multiple input signals to various outputs. For example, switch matrices are used on satellites to provide interconnectivity among the multiple beam antennae. The cross-point or crossbar switch matrix is a particular class of switch matrix which takes the form of an orthogonal arrangement of N input and M output transmission lines which necessarily cross at M×N cross-points and which are terminated in matched loads, as shown in FIG. 1. A crossbar switch matrix and a cross-point switch matrix are identical to one another, the terms cross bar and cross-point being equivalent to one another. At each cross-point, the input and output transmission lines are interconnected by a switching element. By actuating the appropriate switching element each of the signals present at any of the N inputs can be selectively routed to any of the M outputs. The switching element can be realized in a plethora of ways. Presently, the most common method is to use an appropriate configuration of either PIN diodes, bipolar transistors (BJT or HBT) or field effect transistors (FETs, MESFETs, or HEMTs). Often, it is desired to simultaneously route a single input to more than one of the outputs. This has been accomplished by using a switching element which, when actuated, couples only a small fraction of the energy in the input signal, amplifies it and then recouples the signal to the desired output. In this way, the signal incident at a particular cross-point can pass relatively unattenuated to the subsequent cross-points and thereby can also be routed to other outputs in the same manner.

Present cross-point switch matrices are usually constructed in accordance with two approaches. The first utilizes orthogonal three dimensional arrangements of transmission lines, switches, amplifiers, and directional couplers that are fabricated and assembled using multilayer Hybrid Microwave Integrated Circuits (HMIC). The second utilizes Monolithic Microwave Integrated Circuit (MMIC) technology wherein the orthogonal transmission lines and the switching elements are fabricated on a single substrate using semiconductor processing techniques. The orthogonal input and output transmission lines in the MMIC implementation are electrically isolated by routing one of the intersecting lines over the other using metal airbridges.

The MMIC cross-point switch matrix has several significant advantages over the HMIC technique. MMICs are generally smaller in size and have improved reliability due to the fewer welded or soldered interconnections. However, the MMIC switch matrix exhibits poor isolation of undesired input signals to the various outputs. In the MMIC implementation, the microwave signals present on the input transmission lines radiate and are easily coupled to the output transmission lines which are in close proximity. This is especially true at the points where the transmission lines cross over each other by means of the metal air-bridges. Typically, the separation between crossing input and output lines is only a few microns directly underneath the air-bridge and hence the coupling can be quite severe (i.e. low isolation). For example, the typical isolation of two 50 ohm microstrip lines (on a 100 um thick GaAs substrate) which cross by means of an air-bridge is on the order of 35 dB at C-band, and 30 dB at K-band. This level of isolation is not satisfactory for many applications. One attempt to improve the isolation is described in U.S. Pat. No. 5,117,207 for a "Monolithic Microwave Airbridge" and a related paper by Power et al. "Broad Band Monolithic Cross Point Switch Matrices", IEEE Microwave and Millimeter-Wave Circuits Symposium Digest, pp. 127–130, 1990. This approach uses an air-bridge, which incorporates a grounded metal shield between the overpass and underpass transmission lines. In so doing, the isolation of the crossover is improved to 55 dB and 40 dB at C-band and K-band respectively. However, monolithic cross-point switch matrices built with this shielded air-bridge still only exhibit 45 dB of isolation between unconnected channels at C-band, because there is still significant stray coupling between other parts of the circuit. Much higher levels of isolation are achieved in HMIC technology by routing the input and output transmission lines on different substrate layers which are separated by one or more ground planes. It is primarily because of the poor isolation properties of the monolithic switch matrix that the HMIC switch matrices are currently preferred.

SUMMARY OF THE INVENTION

It is an object of the present invention to provide a fully monolithic cross-point switch matrix, which overcomes the isolation problems between unconnected ports of the prior art. This is accomplished by the addition of an Isolation Enhancement Network (IEN) connected between each of the input and output transmission lines at each of the cross-points, as shown in FIG. 2. The switch matrix is comprised of a tiled interconnection of N×M of the 1×1 switch/IEN (SIEN) cells shown in FIG. 3, where N and M are the number of input and output ports respectively.

A monolithic microwave integrated circuit cross-point switch matrix has input and output transmission lines and switching elements located on a substrate using semi conductor processing techniques. The input transmission lines intersect the output transmission lines at cross-points. There is an isolation enhancement network connected between the input transmission lines and the output transmission lines at each cross-point.

A method of operating a monolithic microwave integrated circuit cross-point switch matrix having a switching element and an isolation enhancement network at each cross-point, said method comprising, when the switching element is in an off position, coupling a small amount of an input line signal, phase shifting that signal so that it is 180 degrees out of phase and has the same amplitude as a signal coupled to the output transmission line via stray coupling mechanisms, and, when the switching element is in the "on" position, injecting a signal level onto the output line through the isolation enhancement network that is significantly smaller than a main signal component which passes through the switch element, resulting in an insignificant amount of signal cancellation.

A method of enhancing of a monolithic microwave integrated circuit cross-point switch matrix using a single network that provides both switching and isolation enhancement functions, said switch having a plurality of input transmission lines and output transmission lines that are orthogonal to one another, said method comprising coupling part of the input signal, amplifying the signal that is coupled and phase shifting said signal while directly coupling said signal to an output transmission line so that said signal is 180 degrees out of phase with a signal coupled to the output transmission line by stray coupling mechanisms, applying an appropriate voltage to the single network to control the signal so that it has an amplitude that is either significantly greater or equal to the amplitude of the signal coupled to the output transmission line via stray coupling mechanisms, and, in an "off" position, controlling the signal so that the two signals are at the same amplitude and thereby cancel; or, in an "on" position, the amplitude of the signal passing through the isolation network significantly exceeds the amplitude of the signal coupled to the output transmission line via stray coupling mechanisms.

DESCRIPTION OF A PREFERRED EMBODIMENT

With the exception of the IEN's, the current invention is otherwise similar to the MMIC cross-point switch matrix implementation of the prior art. The invention is a full access switch matrix in which any one or more of a multiplicity of inputs can be simultaneously connected to any one or more, in any combination, to a multiplicity of outputs. As in the prior art, this is accomplished by suing a switching element which, when actuated, couples only a small fraction of the energy in the input signal, amplifies it and then recouples the signal to the desired output. In this way, the signal incident at a particular cross-point can pass essentially unattenuated to the following cross-points and thereby can also be routed to other outputs in the same manner.

Figure 1:
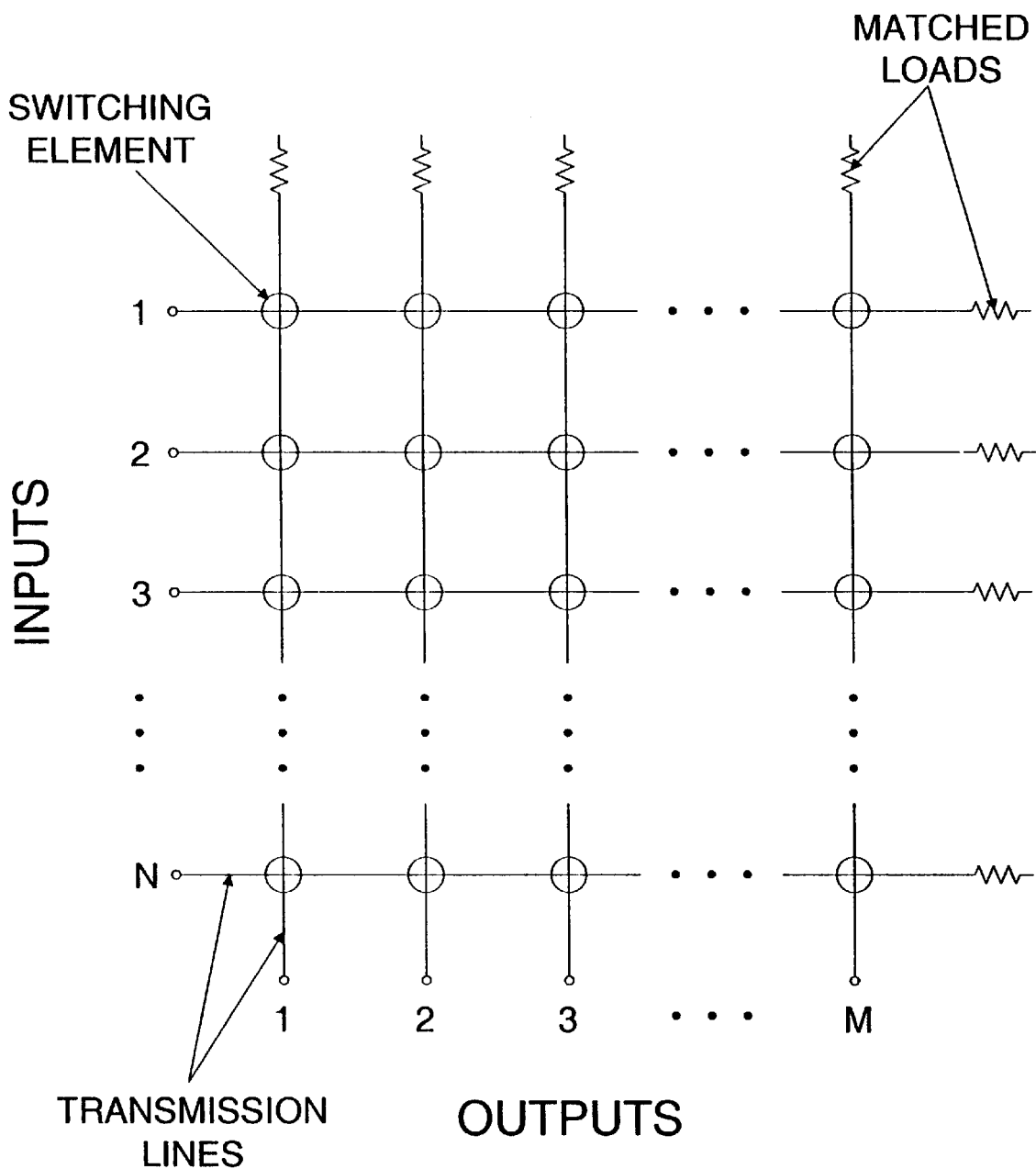
FIG. 1 is a prior art block diagram of a cross-point switch matrix.
Figure 2:
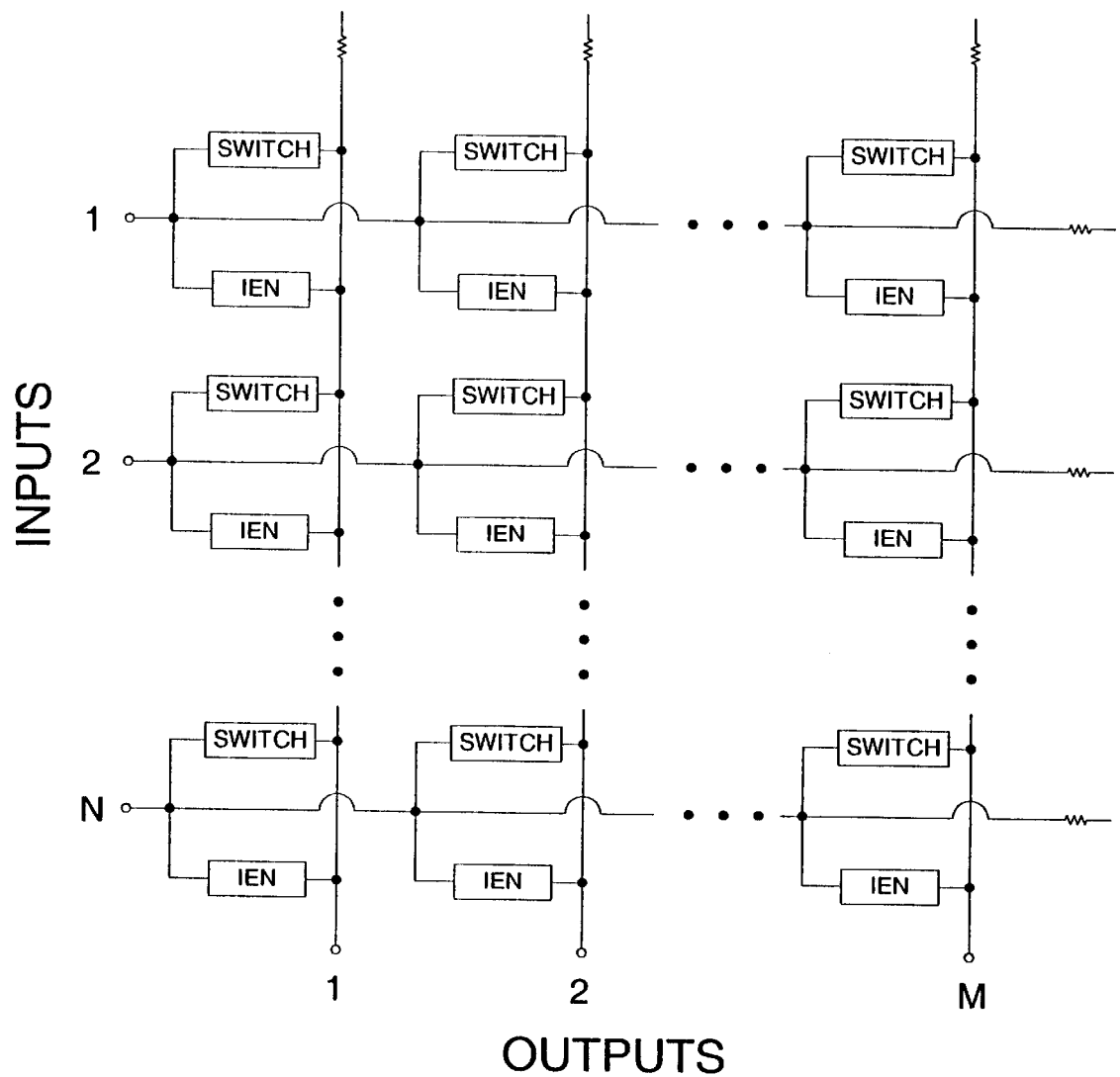
FIG. 2 is a block diagram of a cross-point switch matrix having an isolation enhancement network at each intersection.
Figure 3:
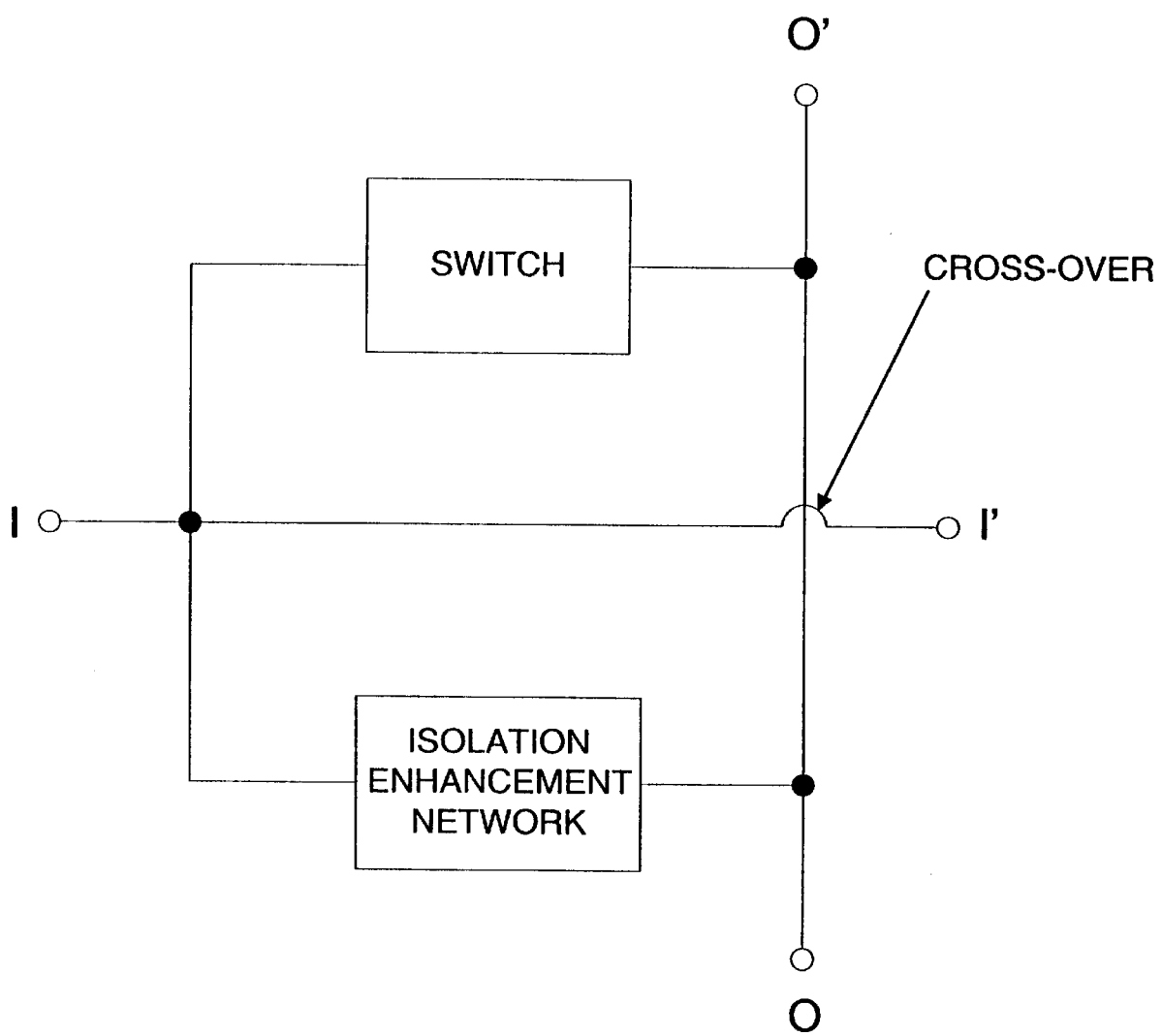
FIG. 3 is an enlarged block diagram of one intersection.

Each of the SIEN cells (FIG. 3) can be independently configured into one of two operating modes, connected or unconnected. The switching element is configured to provide a high isolation path between the input (I-I') and output (O-O') lines in the unconnected mode of operation. In this case, a small fraction of the input signal energy injected at the input port (I) appears at the output port (O). This output signal is comprised of two components. The first component arises from a number of stray coupling mechanisms between the input and output lines but does not include the portion of the input signal which passes through the IEN. The dominant area of this stray coupling occurs at the point where the input and output transmission lines cross. The second component of the output signal is purposely injected via the IEN. The IEN couples a small portion of the input signal, adjusts its amplitude and phase, and then recouples it to the output line so that the resultant signal has the same amplitude, but is 180 degrees out-of-phase with the first component. The result is a cancellation of the two components yielding an improvement in the isolation between the two ports. The compensation signal injected by the IEN into the output line is significantly lower than the main signal component when the switching element is in the connected state, thereby allowing the input signal to be routed to the output with insignificant perturbation.

Figure 4:
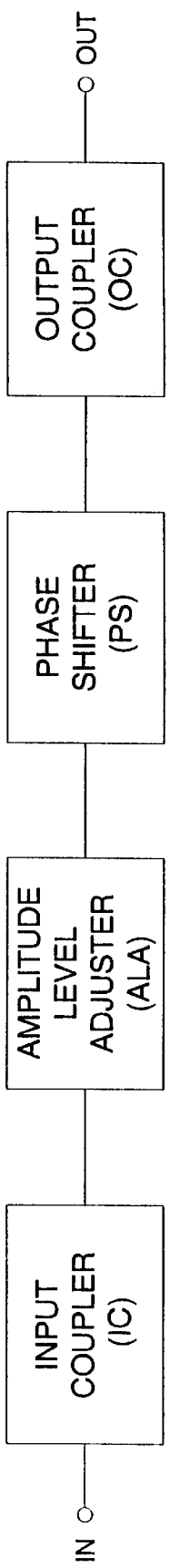
FIG. 4 is a block diagram of an isolation enhancement network.

A generic block diagram of the IEN is shown in FIG. 4.0. In general, the IEN consists of four functional sub-networks, an Input Coupler (IC), an Amplitude Level Adjuster (ALA), a Phase Shifter (PS), and an Output Coupler (OC). This does not mean that the actual physical embodiments must necessarily consist of four distinct sub-networks. In practice, some or all of the four functional sub-networks may be realized individually, whereas others may be grouped together into multi-function networks. For instance, in one particular embodiment the Input and Output Couplers may also provide the functionality of the ALA. The function of the IC and OC is to couple energy into and out of the IEN. Usually, very low levels of coupling factors are used to that the IEN does not overly degrade the VSWR and insertion loss of the input and output transmission lines. The main function of the ALS is to amplify or attenuate the coupled input signal to the desired level at each frequency within the operating band. The PS adjusts the phase of the coupled input signal so as to provide the required phase condition for cancellation of the undesired signal on the output transmission line at each frequency across the operating bandwidth. The ALA and PS can be of the fixed or electrically variable type. The use of electrically variable ALA and/or PS allows post-production alignment in order to yield optimum electrical performance. The IEN can be configured as a non-reciprocal network thereby providing isolation enhancement in only one direction (i.e. from input-to-output or output-to-input). Conversely, the IEN can also be configured as a reciprocal network thereby providing isolation enhancement in both directions simultaneously.

In general, the IEN is separate from the switching element. However, there is at least one preferred embodiment in which the IEN and switching element functions are performed by the same network. In this case, the IEN incorporates an electrically adjustable ALA which can be switched into one of two modes; a low loss or high gain state and an isolation enhancement state.

The preferred embodiments of the invention described in the ensuing paragraphs consist of M×N interconnected SIEN cells where N and M are the number of input and output transmission lines respectively. Each embodiment of the invention is constructed from a unique SIEN cell. In each of the schematic illustrations of the preferred embodiments, the input transmission lines are designated as $I_1$-$I'_1$, $I_2$-$I'_2$, . . . $I_N$-$I'_N$ and the output transmission lines are similarly designated $O_1$-$O'_1$, $O_2$-$O'_2$, . . . , $O_M$-$O'_M$.

Figure 5:
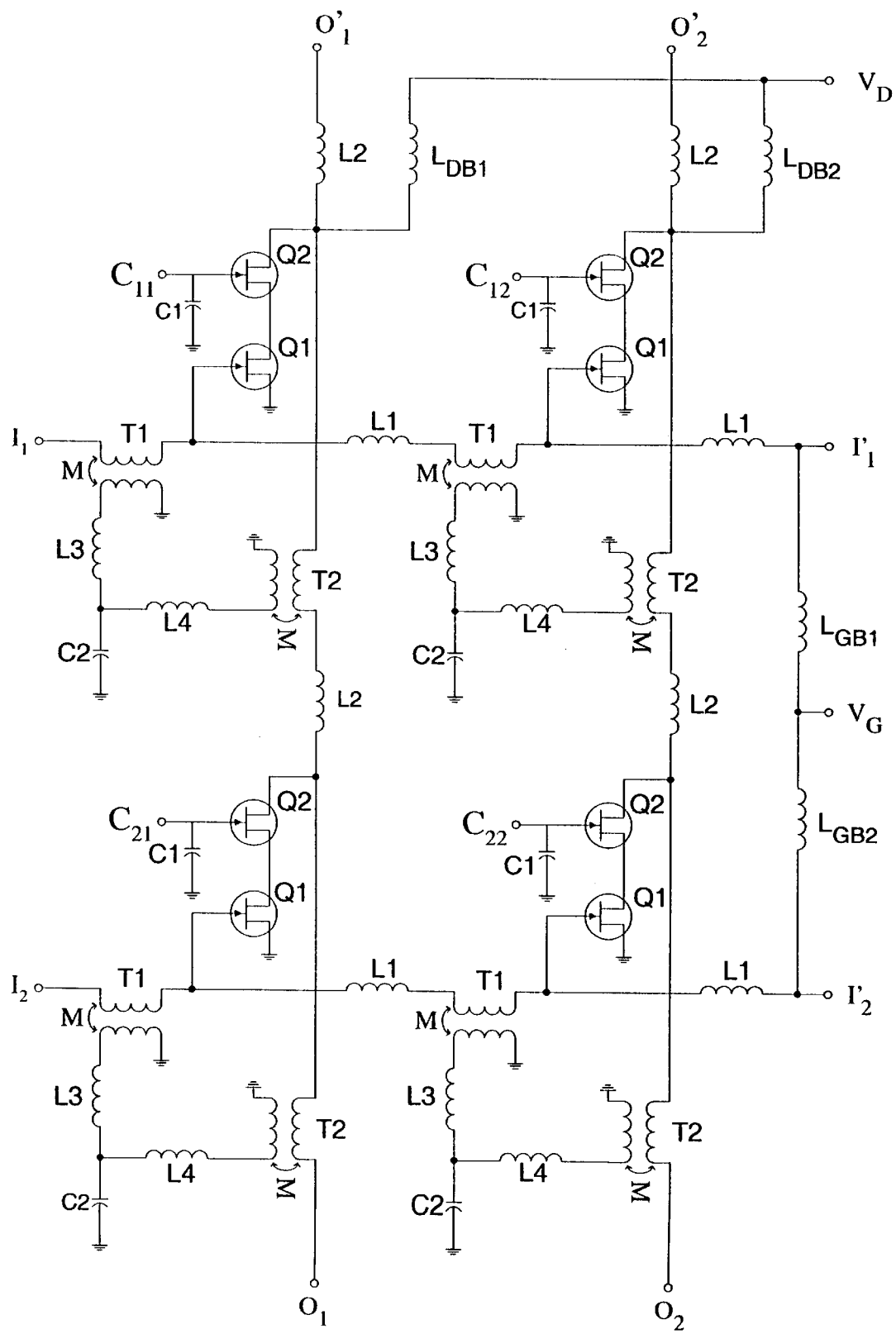
FIG. 5 is an embodiment of a cross-point switch matrix employing a passive isolation enhancement network.
Figure 6:
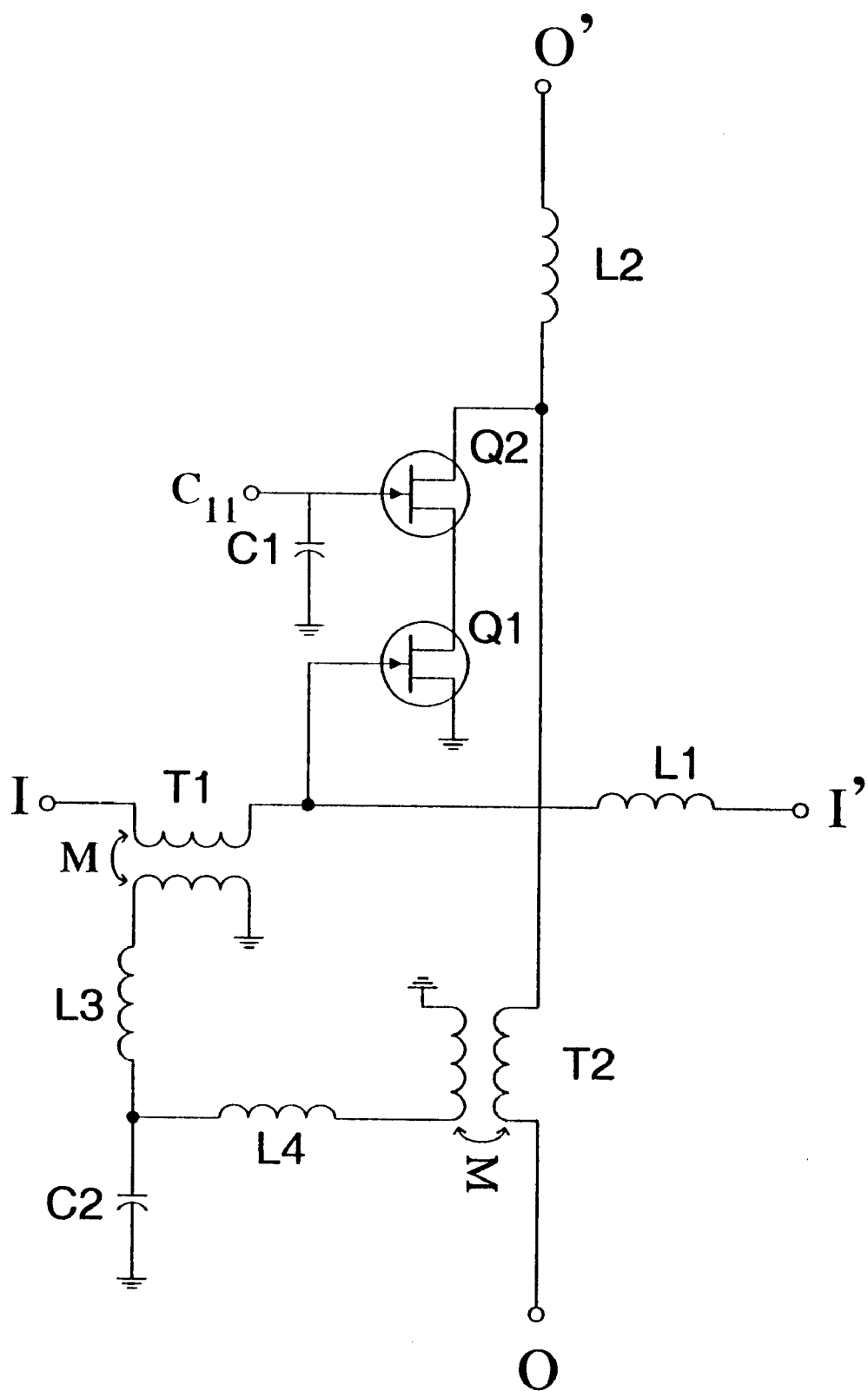
FIG. 6 is a partial circuit diagram of an individual cell from the circuit of FIG. 5.

A schematic representation of a switch matrix with a passive IEN, which is a preferred embodiment of the present invention, is given in FIG. 5. This embodiment consists of N input and M output artificial transmission lines (where N=M=2 in the non-limiting example shown). The switch matrix is derived by interconnecting M×N of the SIEN cells depicted in FIG. 6.

The switching element of the SIEN is composed of the two FET's Q1 and Q2 and the RF bypass capacitor C1. The IEN consists of the mutually coupled inductors T1 and T2, capacitor C2, and the inductors L3 and L4. The switching element is essentially a variable gain amplifier. FET's Q1 and Q2 are connected in cascode with the gate of Q2 connected to an RF ground via capacitor C1. The gate of Q1 and the drain of Q2 are directly coupled to the input and output transmission lines respectively. A control voltage applied to the terminal labeled $C_{11}$ is used to control the on/off state of the switching element.

The input ($I_i$-$I'_i$, I=1, 2, . . . , N) and output ($O_j$-$O'_j$, j=1, 2, . . . , M) lines are artificial transmission lines realized as a cascade of T-type LC ladder networks. The input artificial transmission line is composed of the inductors T1 and L1 and the inherent gate-source capacitance of the transistors Q1. The output transmission line is formulated in a similar fashion by the inductors T2 and L2 and the inherent ground-referenced capacitance at the drain of transistors Q2. Usually, although not shown and not always necessary, an additional capacitor is added at the drain of Q2 (to ground) in order to yield practical values for the inductors T2 and L2 and/or to yield the same impedance and phase velocity for both the input and output transmission lines.

The switch element may be considered as a voltage controlled current source. DC bias is provided to the each of the switch elements via the terminals labeled $V_D$ and $V_G$ and the control terminals labeled $C_{ij}$ in FIG. 5. When a positive voltage is applied to the control input $C_{ij}$, the switch element assumes a conductive or "ON" state in which RF signals may pass with slight amplification. A sufficiently negative voltage on the control input causes the switching element to assume a non-conductive or "OFF" state in which RF signals may not pass. The capacitances of the gate and drain of Q1 and Q2 respectively, remain substantially constant regardless of the "ON" or "OFF" state of the switch, provided that the bias voltages $V_D$ and $V_G$ are held constant. In this case, a signal present at the input port $I_i$ will see a constant impedance formed by the inductors T1 and L1, and the gate capacitance of Q1, as well as the terminating impedance connected to $I_i$. Under such conditions any signal present at an input terminal $I_i$ will travel along the artificial transmission line $I_i$-$I'_i$ with little or no disturbance or distortion which will result in roughly equal RF voltages across the gate-source junction of each of the transistors Q1. If any of the switching elements is in the "ON" state the voltage across the gate-source junction of the associated transistor will modulate the current in the switching element and cause a copy of the input signal to be injected onto the output transmission line. The energy level of the output signal will depend on the transconductance of the switching element and can be designed to provide almost any desired signal level. Similar to the input signal the associated output signal will always encounter the same impedance formed by the inductors T2 and L2, and the drain capacitance of transistors Q2, regardless of the state of the other switching elements that are also connected to the same output line. As a result, a signal applied to any one of the input lines $I_i$-$I'_i$ can be applied simultaneously to a plurality of the outputs $O_j$-$O'_j$.

Ideally, when a switching element is in the "OFF" state, the RF signals present at the associated input should not pass to the output. In practice, a small component of the input signal is always coupled to the output via stray coupling paths as described previously. The function of the IEN is to reduce the level of this unwanted signal at the output. The mutually coupled inductors T1 and T2 provide the functionality of the IC and OC of the IEN and share the role of the ALA. The coupling factor in inductors T1 and T2 is sufficiently small so as not to overly degrade the insertion loss and VSWR of the input and output transmission lines. The PS is provided by the LC T-network formed by inductors L3 and L4 and capacitor C2. The particular arrangement shown for the IEN is one of many possible passive networks which provide the required functionality and should not be viewed as to constrain the invention in any way.

The IEN functions as follows: A small amount of the input signal is coupled by the inductor T1. This signal is then phase shifted by the T-Network arrangement of L3, L4 and C2. Finally, the signal is coupled to the output transmission line via the mutually coupled inductors T2. This resultant signal is nominally 180 degrees out-of-phase and at the same amplitude as the signal coupled to the output transmission line via stray coupling mechanisms. These two signals cancel, thereby yielding an enhancement in the isolation between the input and output ports. This particular IEN also provides isolation enhancement in the reverse direction because it is a reciprocal passive network. A signal injected at the output port will also couple to the input port via the same coupling mechanisms as signals injected into the input port. The IEN will function in the same manner as the previous case and will cancel the undesired signal on the input transmission line, thereby yielding an improvement in isolation between the output and input ports. The signal level injected onto the output line by the IEN is significantly smaller than the main signal component which passes through the switch when the switching element is in the "ON" state. This results in an insignificant amount of signal cancellation when the switch is in the "ON" state and allows the main signal component to pass undisturbed.

Figure 7:
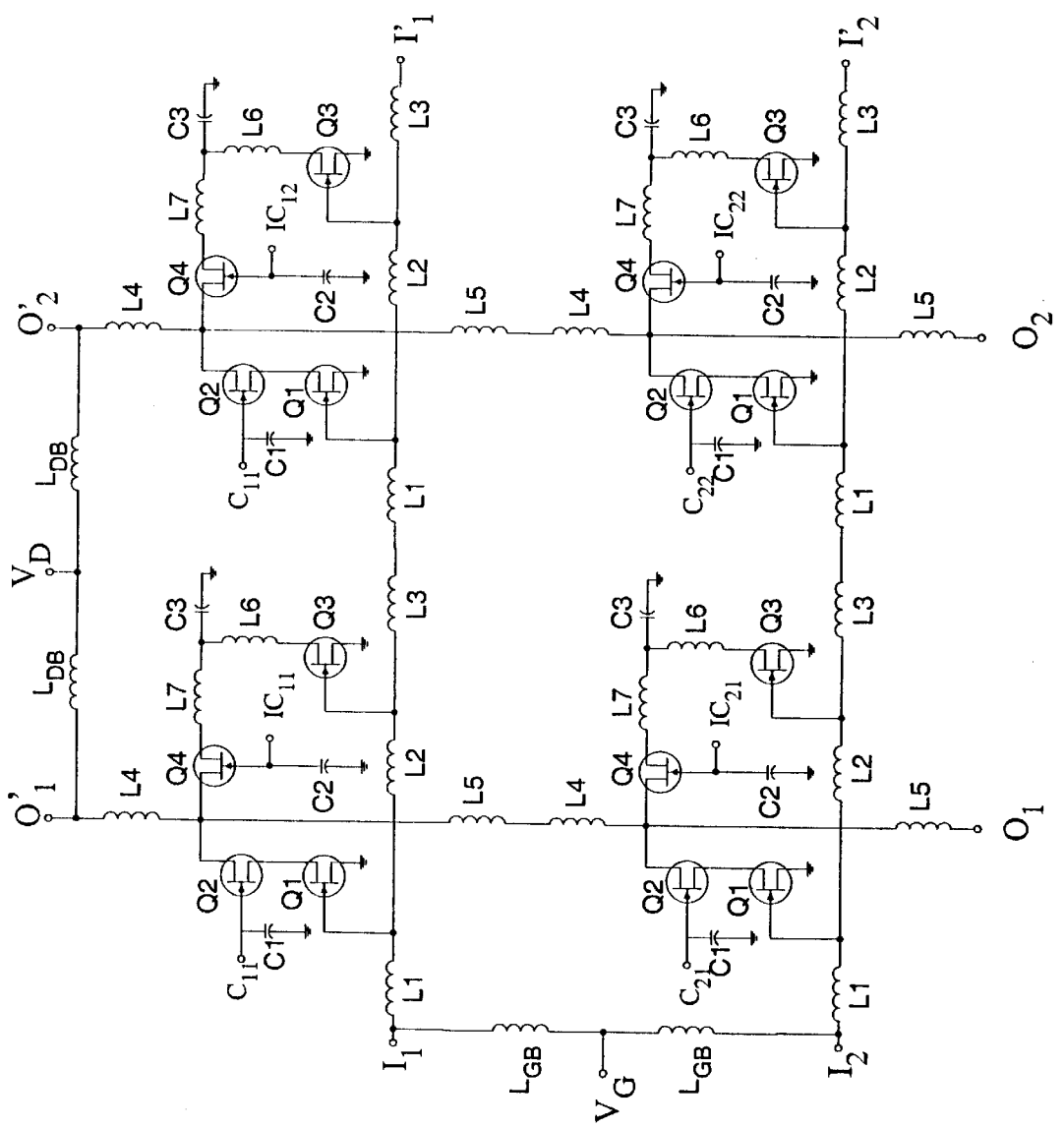
FIG. 7 is a circuit diagram of a switch matrix having an active isolation enhancement network.
Figure 8:
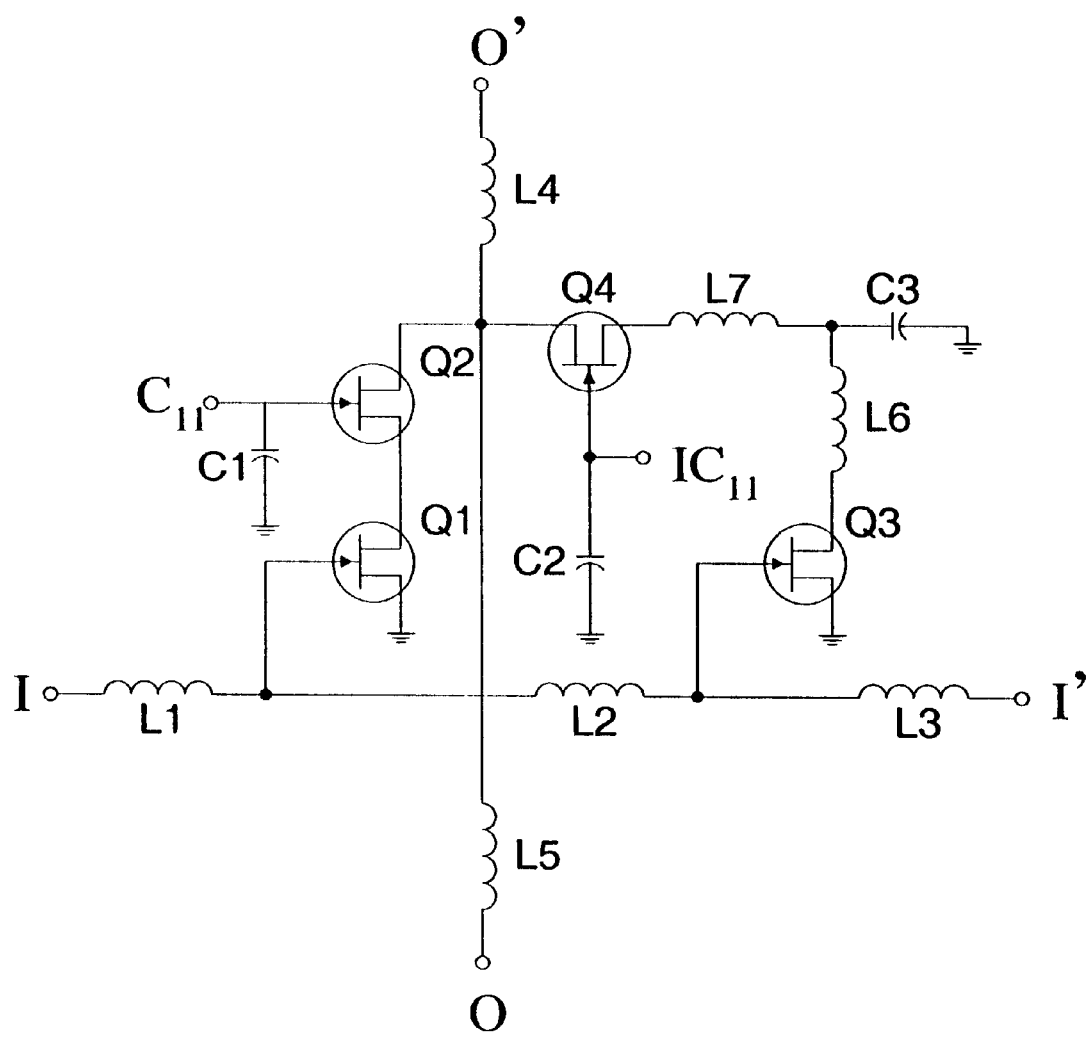
FIG. 8 shows one cell of the circuit of FIG. 7.

A schematic representation of a switch matrix with an active IEN, which is a preferred embodiment of the present invention, is given in FIG. 7. This embodiment consists of N input and M output artificial transmission lines (where N=M=2 in the non-limiting example shown). The switch matrix is derived by interconnecting M×N of the SIEN cells depicted in FIG. 8.

The switching element of the SIEN is composed of the two FET's Q1 and Q2 and the RF bypass capacity C1. The IEN is formed by the FET's Q3 and Q4, the RF bypass capacitor C2, and the artificial transmission line realized with inductors L6 and L7 and capacitor C3. The switching element is essentially a variable gain amplifier. FET's Q1 and Q2 are connected in cascode with the gate of Q2 connected to an RF ground via capacitor C1. The gate of Q1 and the drain of Q2 are directly coupled to the input and output transmission lines respectively. A control voltage applied to the terminal labeled $C_{11}$ is used to control the on/off state of the switching element. The IEN is also a variable gain cascode amplifier but, unlike the switching element, it contains the additional elements L6, L7, and C3 which provide the PS functionality. The gain through the IEN can be adjusted by the control voltage applied to the terminal labeled $IC_{11}$. Unlike the switching element, the IEN is always biased on.

The input ($I_i$-$I_i$, I=1,2, . . . , N) and output ($O_j$-$O'_j$, j=1, 2 . . . , M) lines are artificial transmission lines realized as a cascade of T-type LC ladder networks. The input artificial transmission line is composed of the inductors L1, L2 and L3 and the inherent gate-source capacitance of the transistors Q1 and Q3. The output transmission line is formulated in a similar fashion by the inductors L4 and L5 and the parallel combination of the inherent ground-referenced capacitance of the drain of transistors Q2 and Q4. Usually, although not shown and not always necessary, an additional capacitor is added at the drain of Q2 and Q4 (to ground) in order to yield practical values for the inductors L4 and L5 and/or to yield the same impedance and phase velocity for both the input and output transmission lines.

The switching element may be considered as a voltage controlled current source. Dc bias is provided to each of the switching elements as well as the IEN via the terminals labeled $V_D$ and $V_G$ and the control terminals labeled $C_{ij}$, and $Ic_{ij}$ in FIG. 7. When a positive voltage is applied to the control input $C_{ij}$, the switching element assumes a conductive or "ON" state in which RF signals may pass with slight amplification. A sufficiently negative voltage on the control input causes the switching element to assume a non-conductive or "OFF" state in which RF signals may not pass. The capacitances of the gate and drain of Q1 and Q2 (as well as Q3 and Q4) respectively, remain substantially constant regardless of the "ON" or "OFF" state of the switch, provided that the bias voltages $V_D$ and $V_G$ are held constant. In this case, a signal present at the input port $I_i$ will see a constant impedance formed by the inductors L1, L2, and L3, and the gate capacitance of Q1 and Q3, as well as the terminating impedance connected to $I_i$. Under such conditions any signal present at an input terminal Ii will travel along the artificial transmission line $I_i$-$I'_i$ with little or no disturbance or distortion which will result in roughly equal RF voltages across the gate-source junction of each of the transistors Q1 and Q3. If any of the switching elements is in the "ON" state the voltage across the gate-source junction of the associated transistor will modulate the current in the switching element and cause a copy of the input signal to be injected onto the output transmission line. The energy level of the output signal will depend on the transconductance of the switching element and can be designed to provide almost any desired signal level. Similar to the input signal, the associated output signal will always encounter the same impedance formed by the inductors L4 and L5, and the parallel combination of the drain capacitance of transistors Q2 and Q4, regardless of the state of the other switching elements that are also connected to the same output line. As a result, a signal applied to any one of the input lines $I_i$-$I'_i$ can be applied simultaneously to a plurality of the outputs $O_j$-$O'_j$.

Ideally, when a switching element is in the "OFF" state the RF signals present at the associated input should not pass to the output. In practice, a small component of the input signal is always coupled to the output via stray coupling paths as described previously. The function of the IEN is to reduce the level of this unwanted signal at the output. Transistors Q3 and Q4 provide the functionality of the IC and OC of the IEN and share the role of the ALA. The PS is provided by the LC T-network formed by inductors L6 and L7 and capacitor C3. the particular arrangement shown for the IEN is one of many possible active networks which provide the required functionality and should not be viewed as to constrain the invention in any way.

The IEN is a variable gain cascode amplifier with a prescribed insertion phase controlled by the elements L6, L7, and C3. The gain through the IEN is adjusted by the control voltage applied to the terminal labeled $IC_{11}$. Unlike the switching element, the IEN is always biased on. The input signal is sampled across the gate-source junction of transistor Q3. This signal is then amplified by Q3 and Q4 and is phase shifted by the T-Network arrangement of L6, L7, and C3. Finally, the signal is directly coupled to the output transmission line via the drain of transistor Q4. This resultant signal is nominally 180 degrees out-of-phase and at the same amplitude as the signal coupled to the output transmission line via stray coupling mechanisms. These two signals cancel, thereby yielding an enhancement in the isolation between the input and output ports. The signal level injected onto the output line by the IEN is significantly smaller than the main signal component which passes through the switch when the switching element is in the "ON" state. This results in an insignificant amount of signal cancellation when the switch is in the "ON" state and allows the main signal component to pass undisturbed.

Figure 9:
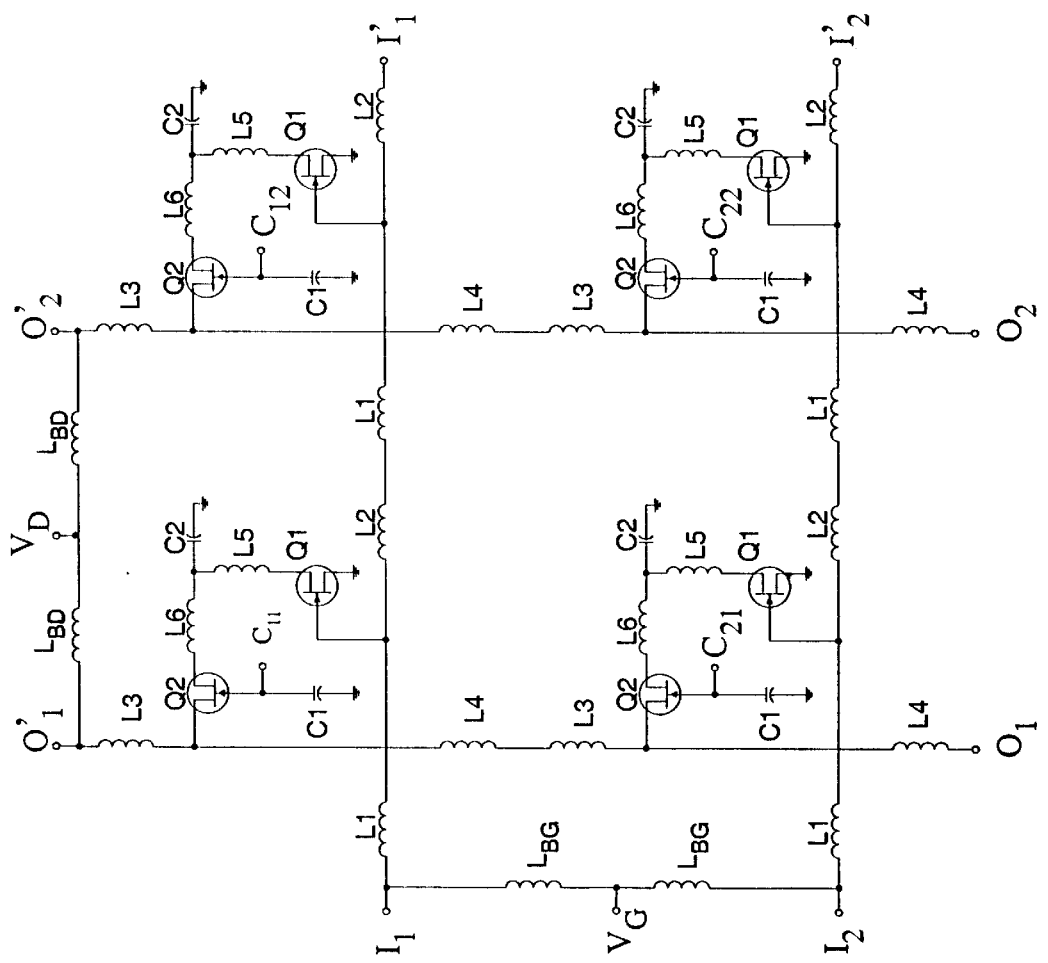
FIG. 9 is a circuit of a switch matrix having a dual function isolation enhancement network.
Figure 10:
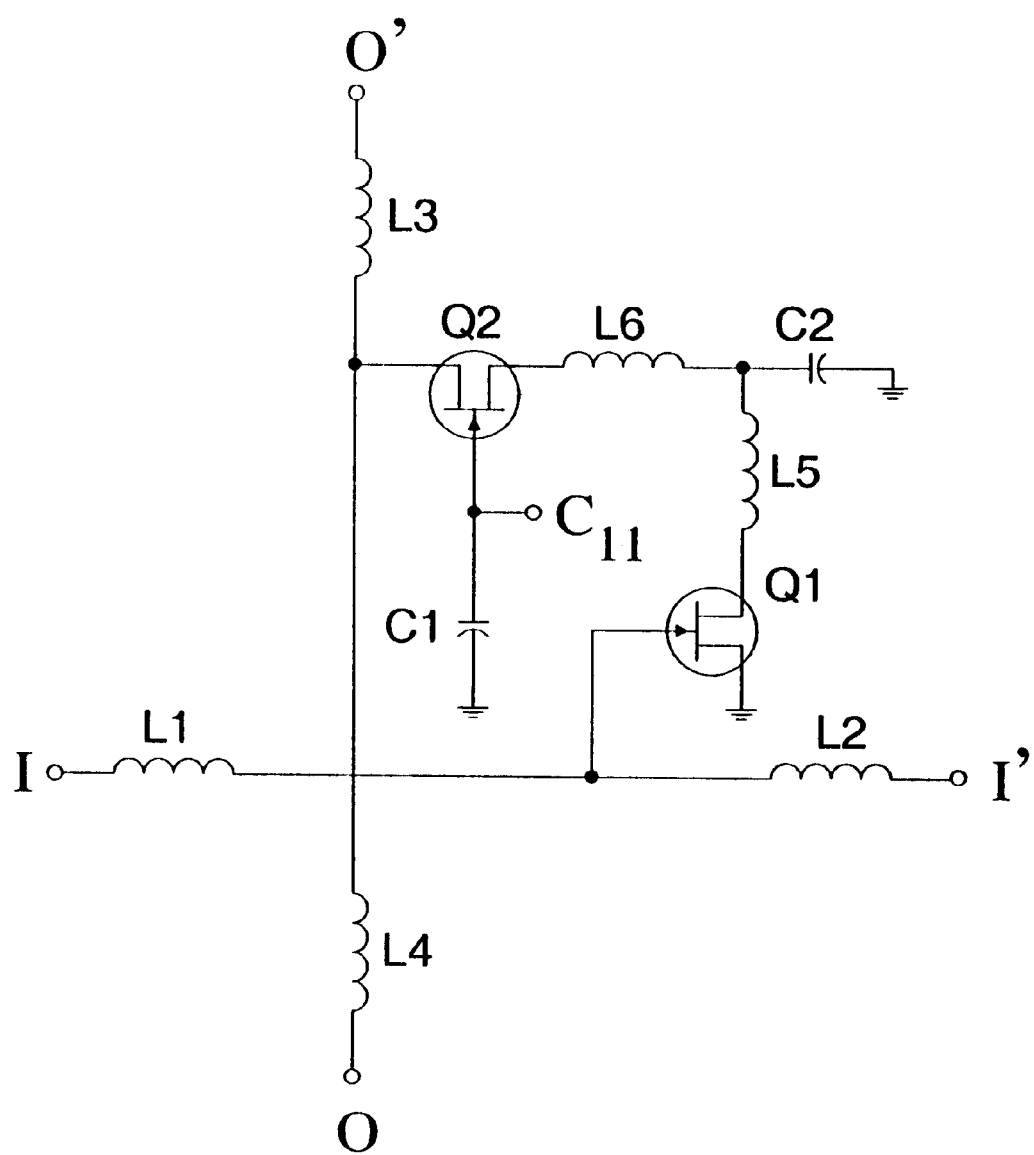
FIG. 10 is a drawing of one cell of the circuit of FIG. 9.

A schematic representation of a switch matrix, which is a preferred embodiment of the present invention, is shown in FIG. 9. In this preferred embodiment, a single isolation enhancement network provides both the switching and isolation enhancement functions. This network is given in FIG. 10 and is referred to as a dual function IEN (DFIEN) cell. This embodiment consists of N input and M output artificial transmission lines (where N=M=2 in the non-limiting example shown). The switch matrix is derived by interconnecting (M×N of the DFIEN cells.

The input ($I_i$-$I'_i$, i=1, 2, . . . , N) and output ($O_j$-$O'_j$, j=1, 2, . . . , M) lines are transmission lines realized as a cascade of T-type LC ladder networks. The input artificial transmission line is composed of the inductors L1 and L2 and the inherent gate-source capacitance of the transistors Q1. The output transmission line is formulated in a similar fashion by the inductors L3 and L4 and the inherent ground-referenced capacitance of the drain of transistors Q2. Usually, although not shown and not always necessary, an additional capacitor is added at the drain of Q2 (to ground) in order to yield practical values for the inductors L3 and L4 and/or to yield the same impedance and phase velocity for both the input and output transmission lines.

The DFIEN cell is a variable gain cascode amplifier with a prescribed insertion phase. The gain through the FIEN is adjusted by the control voltage applied to the terminal labeled $C_{11}$. The insertion phase of the DFIEN cell is set to a prescribed value by the T-Network arrangement of inductors L5, L6 and C2. The input signal is sampled across the gate-source junction of transistor Q1. This signal is then amplified by Q1 and Q2 and is phase shifted by the T-Network arrangement of L5, L6, and C2. Finally, the signal is directly coupled to the output transmission line via the drain of transistor Q2. This resultant signal is nominally 180 degrees out-of-phase with the signal coupled to the output transmission line via stray coupling mechanisms. The amplitude of the signal passing through the DFIEN cell can be set, to either significantly exceed or equal the amplitude of the signal coupled to the output via stray coupling mechanisms, by applying the appropriate voltage tot he control terminal $C_{11}$. When the two signals are at the same amplitude, they cancel, thereby yielding high isolation between the input and output paths. When operated in this mode, the DFIEN cell is said to be in the "OFF" or "ISOLATED" state. Alternatively, when the amplitude of the signal passing through the DFIEN cell significantly exceeds the amplitude of the signal coupled to the output transmission line via stray coupling mechanisms, only a small portion of the signals are canceled, thereby yielding a low loss or high gain connection between the input and output lines. When operated in this mode the DFIEN cell is said to be in the "ON" or "CONNECTED" state. The particular arrangement shown (FIG. 10) for the IEN is one of many possible active networks which provide the required functionality and should not be viewed as to constrain the invention in any way.

Dc bias is provided to each of the DFIEN cells via the terminals labeled $V_D$ and $V_G$ and the control terminals labeled $C_{ij}$ in FIG. 9. The capacitances of the gate and drain of Q1 and Q2 respectively, remain substantially constant regardless of the operating mode of the DFIEN cell, provided that the bias voltages $V_D$ and $V_G$ are held constant. In this case, a signal present at the input port $I_i$ will see a constant impedance formed by the inductors L1 and L2, and the gate capacitance of Q1, as well as the terminating impedance connected to $I'_i$. Under such conditions, any signal present at an input terminal $I_i$ will travel along the artificial transmission line $I_i$-$I^1_i$ with little or no disturbance or distortion which will result in roughly equal RF voltages across the gate-source junction of each of the transistors Q1. If any of the DFIEN cells are in the "CONNECTED" mode, the voltage across the gate-source junction of the associated transistor will modulate the current in the DFIEN cell and cause a copy of the input signal to be injected onto the output transmission line. The energy level of the output signal will depend on the transconductance of the DFIEN cell and can be designated to provide almost any desired signal level. Similar to the input signal, the associated output signal will always encounter the same impedance formed by the inductors L3 and L4, and the drain capacitance of transistors Q2, regardless of the state of the other DFIEN cells that are also connected to the same output line. As a result, a signal applied to any one of the input lines $I_i$-$I'_i$ can be applied simultaneously to a plurality of the outputs $O_j$-$O'_j$.

I claim:

1. A monolithic microwave integrated circuit cross-point switch matrix comprising orthogonal input and output transmission lines and switching elements located on a substrate using semiconductor processing techniques, said input transmission lines intersecting said output transmission lines at cross-points, there being an isolation enhancement network connected between said input transmission lines and said output transmission lines at each cross-point, said isolation enhancement network comprising a phase adjuster and an amplitude adjuster.

2. Switch matrix as claimed in claim 1 wherein there is a switching element connected between said input and output transmission lines at each cross-point.

3. A switch matrix as claimed in claim 2 wherein the phase adjuster is a phase shifter.

4. A switch matrix as claimed in claim 3 wherein the amplitude adjuster is an attenuator.

5. A switch matrix as claimed in claim 4 wherein each of the switching elements and isolation enhancement networks are coupled into the input and output transmission lines.

6. A switch matrix as claimed in claim 5 wherein the switching element has a first transistor and a second transistor connected in cascode with a gate of the second transistor connected to an RF ground through a first capacitor, a gate of the first transistor and the drain of the second transistor being directly coupled to the input and output transmission lines respectively.

7. A switch matrix as claimed in claim 6 wherein there is a voltage terminal connected to said gate of the second transistor, said voltage terminal controlling the on/off state of the switching element based on the voltage applied to said terminal.

8. A switch matrix as claimed in claim 7 wherein the isolation enhancement network has a first inductor and a second inductor connected between the input and output transmission lines respectively with a line connected to ground via a second capacitor.

9. A switch matrix as claimed in claim 2 wherein said input and output transmission lines are substantially orthogonal to one another.

10. A switch matrix as claimed in claim 1 wherein there are M output transmission lines and N input transmission lines, each input transmission line being composed of first inductors and an inherent gate-source capacitance of first transistors, each output transmission line being composed of second inductors and an inherent ground-referenced capacitance at a drain of second transistors.

11. A switch matrix as claimed in claim 10 wherein there is a switching element at each intersection with a control input thereon, said switching element assuming on "on" state when a positive voltage is applied to said control input and assuming an "off" state when a sufficiently negative voltage is applied to said control input.

12. A switch matrix as claimed in claim 10 wherein each switching element is composed of a first and second transistor and a first RF bypass capacitor and each isolation enhancement network is formed by a third and fourth transistor and a second RF bypass capacitor.

13. A switch matrix as claimed in claim 12 wherein each switching element is essentially a variable gain amplifier with said first and second transistors being connected in cascode with a gate of the second transistor connected to an RF ground via the first capacitor, the gate of the first transistor and the drain of the second transistor being directly coupled to said input and output transmission lines respectively.

14. A switch matrix as claimed in claim 13 wherein the isolation enhancement network is also essentially a variable gain amplifier, a gain through the isolation enhancement network being adjustable by a control voltage applied to a voltage terminal of the isolation enhancement network.

15. A switch matrix as claimed in claim 10 wherein said input transmission line is composed of a first, second and third inductor and an inherent gate-source capacitance of a first and third transistor and said output transmission line is composed of a fourth and fifth inductor and a parallel combination of an inherent ground reference capacitance of a drain of second and fourth transistors.

16. A switch matrix as claimed in claim 10 wherein each isolation enhancement network is connected to an active network.

17. A switch matrix as claimed in claim 10 wherein each isolation enhancement network is connected to be a passive network.

18. A switch matrix as claimed in claim 10 wherein each isolation enhancement network is connected to be a dual function network.

19. A method of operating a monolithic microwave integrated circuit cross-point switch matrix having a switching element and an isolation enhancement network at each cross-point, said method comprising, when the switching element is in an off position, coupling a small amount of an input line signal, phase shifting that signal so that it is 180 degrees out of phase and has the same amplitude as a signal coupled to the output transmission line via stray coupling mechanisms, and, when the switching element is in the "on" position, injecting a signal level onto the output line through the isolation enhancement network that is significantly smaller than a main signal component which passes through the switch element, resulting in an insignificant amount of signal cancellation.

20. A method of enhancing of a monolithic microwave integrated circuit cross-point switch matrix using a single network that provides both switching and isolation enhancement functions, said switch having a plurality of input transmission lines and output transmission lines that intersect one another, said method comprising coupling part of the input signal, amplifying the signal that is coupled and phase shifting said signal while directly coupling said signal to an output transmission line so that said signal is 180 degrees out of phase with a signal coupled to the output transmission line by stray coupling mechanisms, applying an appropriate voltage to the single network to control the signal so that it has an amplitude that is either significantly greater or equal to the amplitude of the signal coupled to the output transmission line via stray coupling mechanisms, and, in an "off" position, controlling the signal so that the two signals are at the same amplitude and thereby cancel; or, in an "on" position, the amplitude of the signal passing through the isolation network significantly exceeds the amplitude of the signal coupled to the output transmission line via stray coupling mechanisms.

* * * * *